May 27, 1969   F. C. ARRANCE ET AL   3,446,669
SINTERED METAL OXIDE BATTERY SEPARATOR AND BATTERY
Filed June 7, 1966
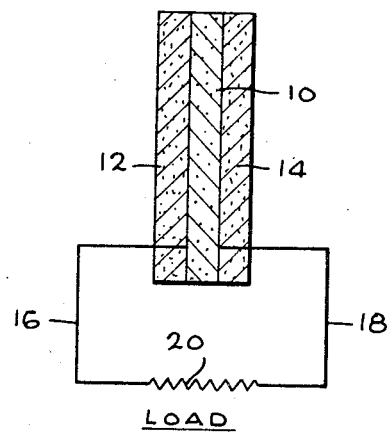
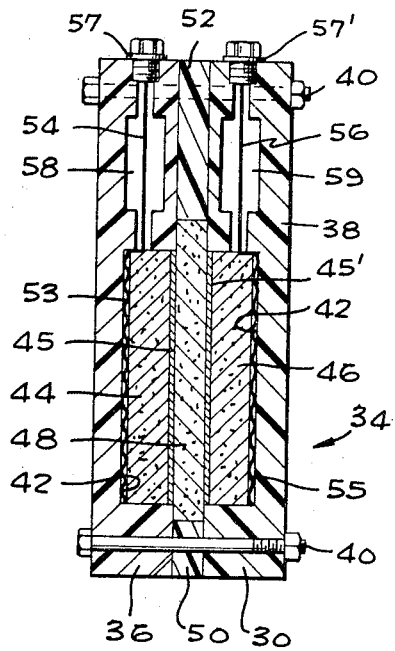
FRANK C. ARRANCE
CARL BERGER
INVENTORS
BY Max Gelden
ATTORNEY

United States Patent Office 3,446,669
Patented May 27, 1969

3,446,669
SINTERED METAL OXIDE BATTERY SEPARATOR AND BATTERY
Frank C. Arrance, Costa Mesa, and Carl Berger, Santa Ana, Calif., assignors, by mesne assignments, to McDonnell Douglas Corporation, Santa Monica, Calif., a corporation of Maryland
Filed June 7, 1966, Ser. No. 555,891
Int. Cl. H01m 35/04
U.S. Cl. 136—6                                   20 Claims

ABSTRACT OF THE DISCLOSURE

Production of battery separators having improved strength and resistance to alkali, good porosity and conductivity, and improved resistance to impact and vibration, and particularly designed for use in high energy density batteries, in the form of a sintered porous member consisting essentially of a solid solution of a major proportion of an aluminum-bearing material, such as aluminum oxide, and a substance selected from the group consisting of chromium, cobalt, nickel, magnesium, calcium and iron-bearing materials, such as chromic oxide.

---

This invention relates to batteries, particularly high energy density batteries, and is especially concerned with improved inorganic membranes or separators for use in batteries, particularly high energy density batteries, such separators having improved strength and resistance to alkali, and good porosity characteristics, and with improved battery constructions embodying such improved separators, and which are capable of a large number of discharge-charge cycles at ambient and at elevated temperature and having good voltage characteristics during discharge.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional batteries, e.g., lead-acid storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In batteries, e.g., conventional lead-acid batteries and high energy density batteries such as silver-zinc, nickel-cadmium and silver-cadmium, the separator performs the function of retaining electrolyte, e.g., acid or alkali such as potassium hydroxide, separating the electrodes, and preventing migration of electrode ions or growth of dendritic crystals of electrode ions which short circuit the battery. It has been known to employ organic separators in such batteries, but these have several disadvantages. Thus, such organic separators are not chemically stable, especially at temperatures above 50° C., they tend to swell excessively at elevated temperatures, and most organics are not readily wetted by caustic solutions. Further, where silver oxide functions as an electrode material, as in a high energy density battery, organics are not inert to silver oxide in caustic solutions, and organic materials are generally soft and pliable and are subject to puncture by dendrite growth.

Improved inorganic separators, particularly suited for use in high energy density batteries, are described, for example, in our copending application Ser. No. 499,294, filed Oct. 21, 1965, now Patent No. 3,379,570. Such inorganic separators, preferably in the form of sintered ceramic separators, when assembled in a battery, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above.

However, the continued development of inorganic separators having improved strength and improved resistance particularly to alkali electrolytes employed in such high energy density batteries, such as potassium hydroxide, and having high porosity, and designed particularly for incorporation in high energy density batteries to obtain improved battery performance, such as high discharge voltage and improved impact, vibration and environmental characteristics, is of particular interest to the industry.

According to the invention, it has been found that improved battery separators can be produced, and designed particularly for use in high energy density batteries, such as silver-zinc, silver-cadmium and nickel-cadmium batteries, from a mixture of aluminum-bearing material such as aluminum oxide (alumina) with certain inorganic materials described in detail hereinafter, which form solid solutions. Thus, according to the invention a battery separator is produced in the form of a solid solution of a major proportion of an aluminum-bearing material, e.g., aluminum oxide, and a substance selected from the group consisting of chromium, cobalt, nickel, magnesium, calcium, and iron-bearing materials. For example, a composition consisting of a mixture of aluminum oxide in major proportion and one or more inorganic materials including chromic oxide, cobalt oxide, nickel oxide, magnesium oxide, calcium oxide and iron oxide, is first prepared, and such mixture is formed into a desired shape and sintered to produce a sintered porous member consisting essentially of a solid solution of aluminum oxide and one or more of the inorganic materials or oxides noted above. As pointed out more fully below, the solid solution separators of the invention are substantially free of silicon-bearing materials such as silicon dioxide.

Solid solution inorganic separators of the type produced according to the invention have improved strength and resistance to potassium hydroxide, good porosity and conductivity, and improved resistance to impact and vibration. Thus, according to one embodiment, a mixture of a major proportion of alumina ($Al_2O_3$) and a minor proportion of chromic ovide ($Cr_2O_3$), when formed into battery separator configurations, compressed and sintered, form very strong separators having a transverse strength of the order of about 10,000 p.s.i. or more, good porosity, good conductivity in aqueous potassium hydroxide electrolyte, excellent KOH resistance, and are extremely durable.

Single phase solid solutions forming high strength porous sintered membranes for use as battery separators, are produced according to the invention employing at least about 75% by weight of the aluminum-bearing material, e.g., aluminum oxide, and the remainder being composed of one or more of the other inorganic components noted above, i.e., the chromium, cobalt, nickel, magnesium, calcium and iron-bearing materials, e.g., as their oxides. Preferably, the sintered porous solid solution separators of the invention are formed from mixtures containing in the range from about 90 to as high as about 99.75% of aluminum-bearing material, e.g., aluminum oxide, and in the range from about 0.25 to about 10% of such other inorganic component or components, by weight. Most desirably, in the range from about 0.25 to about 8% by weight of such other inorganic component, e.g., in the form of their oxides, such as chromic oxide, is utilized, the remainder being aluminum-bearing material, e.g., aluminum oxide.

Examples of mixtures of aluminum oxide and other inorganic components which when combined in proportions within the above noted ranges, compacted and sintered, form solid solution separators according to the invention, are set forth below:

Composition:
- A — Aluminum oxide and chromic oxide ($Al_2O_3$-$Cr_2O_3$).
- B — Aluminum oxide and cobalt oxide ($Al_2O_3$-$CoO$).
- C — Aluminum oxide and nickel oxide ($Al_2O_3$-$NiO$).
- D — Aluminum oxide, chromic oxide and nickel oxide ($Al_2O_3$-$Cr_2O_3$-$NiO$).
- E — Aluminum oxide and magnesium oxide ($Al_2O_3$-$MgO$).
- F — Aluminum oxide and calcium oxide ($Al_2O_3$-$CaO$).
- G — Aluminum oxide, calcium oxide, and magnesium oxide ($Al_2O_3$-$CaO$-$MgO$).
- H — Aluminum oxide and iron oxide ($Al_2O_3$-$Fe_2O_3$).

In carrying out the invention for obtaining the improved solid solution separators hereof, any suitable aluminum-bearing compound and any suitable compounds of chromium, cobalt, nickel, magnesium, calcium and iron can be employed, which as result of heat treatment are capable of being converted to the corresponding oxides. Thus, for example, all of the starting compounds employed can be in the form of their oxides, as noted in Compositions A to H illustrated above. However, other compounds of aluminum, and of chromium, cobalt, nickel, magnesium, calcium and iron, which can be utilized include the carbonates, sulfates and chlorides of such metals, since these materials upon heating or sintering in the presence of air will be converted to the corresponding oxides. Thus, for example, a mixture of aluminum oxide and calcium carbonate or chloride can be employed, or a mixture of aluminum chloride and magnesium carbonate or chloride can be utilized.

It will be noted from Compositions A to H above that the inorganic additive components intermixed with the aluminum-bearing material or alumina, can be a single component such as the chromic oxide of Composition A above, or a combination of two or more of such components, such as the combination of chromic oxide and nickel oxide in Composition D above of the combination or calcium oxide and magnesium oxide in Composition G above.

To produce the improved solid solution separators of the invention, the starting mixture of the components thereof should be substantially free of silicon-containing materials, such as silicon dioxide, either as free $SiO_2$ or combined with one of the components of the starting mixture, e.g., combined with aluminum oxide, e.g., as an aluminosilicate.

The structure of the solid solution separators of the invention can be readily identified by crystallographic and X-ray diffraction methods, such structures generally being in the form of ionic substitution in isostructural groups wherein each group is capable of entering the lattice of the other, and the lattice space requirements are sufficiently close so that either ion can fill the space requirement with equal ease. See Dana's Manual of Mineralogy, 17th edition, pages 204 and 205.

The aluminum-bearing, e.g., aluminum oxide-containing, solid solution separators of the invention, in addition to possessing the improved characteristics noted above, when incorporated in a high energy density battery such as a silver-zinc battery, result in a highly efficient battery which can be cycled and recycled over hundreds of discharge-charge cycles, at both ambient and elevated temperatures of the order of 100° C. and above, without serious reduction in efficiency. Also, an improvement in voltage performance is observed, the voltage plateau during discharge being higher than the voltage discharge of a similar battery employing other types of separators. Such improved inorganic separators produced according to the invention can be employed in both primary and secondary batteries. However, the use of such inorganic separators in long lived secondary batteries, particularly high energy density batteries, is of particular value.

The porosity of the separator can also be controlled by varying the proportions of the components, for example, aluminum oxide and chromium oxide, employed in producing the improved separator, and such variations and proportions of components also permits control of the strength characteristics of the separator. The porosity of the separator can be varied considerably depending on whether the separators are to be used in a primary or secondary battery. For use in a primary battery which has a relatively short life, a separator of high porosity to provide greater activity can be employed, and for secondary batteries, e.g., of the high energy density type, such as a silver-zinc battery, a separator of reduced porosity for providing longer life can be employed. The degree and specific range of porosity which can be provided for the improved separators of the invention are described in greater detail hereinafter.

The solid solution separators of the invention exhibit improved properties, e.g., with respect to strength, resistivity, and long cycle life, as compared to separators formed from similar starting materials or mixtures, but which contain silicon-bearing materials, e.g., $SiO_2$.

The invention will be further described in relation to the accompanying drawing wherein:

FIG. 1 is a schematic representation of a battery assembly including electrodes assembled in conjunction with a separator produced according to the invention, and FIG. 2 shows the manner of assembly of a separator according to the invention, and electrodes to form a battery according to the invention.

The illustrations of the drawing are exaggerated for purposes of greater clarity.

In carrying out the invention for obtaining an improved aluminum oxide-containing solid solution separator hereof, a mixture of alumina or other suitable aluminum-containing material such as aluminum chloride, and the selected inorganic additive component or components noted above, e.g., chromic oxide, are mixed in proportions within the ranges noted above to produce a solid solution upon sintering the mixture. Such mixture is first compacted, e.g., at pressure ranging from about 2,000 to about 10,000 p.s.i., into the form or shape of the separator desired, e.g., in the form of a disc. Such compressed separator members or discs are then subjected to sintering at temperature ranging from about 800° C. to about 1,800° C. for a period sufficient to convert the components of the starting mixture into solid solutions as described above. This generally requires a period of sintering which can range from about ½-hour to about 10 hours, usually from about 1 to about 5 hours.

The aluminum-containing solid solution separators produced according to the invention have a transverse strength ranging from about 4,000 to about 10,000 p.s.i. and above. The porosity of the separator can be controlled to obtain a desired value, so that such porosity can range from about 10% to about 50%. The desired porosity can be obtained by adjusting the proportions of the respective starting materials employed, such as aluminum oxide and chromic oxide, and the sintering time and temperature utilized. The solid solution separators of the invention have pore size characteristics permitting retention of electrolyte and passage of electrolyte ions such as the hydroxyl ion, while preventing migration of electrode ions, e.g., silver ions, through the separator.

Referring to FIG. 1 of the drawing, a sintered aluminum oxide-chromic oxide separator according to the invention and represented by numeral 10, has pressed against opposite sides thereof a zinc electrode indicated at 12, and a silver electrode indicated at 14. Wires 16 and 18 connect the electrodes 12 and 14, respectively, to a load 20, thus forming an operative battery.

It will be noted in the schematic illustration of FIG. 1 that the inorganic separator 10 of the invention also aids in supporting the metal electrodes 12 and 14, which are pressed against opposite surfaces of the separator.

The following are examples of practice of the invention:

*Example 1*

A mixture of 97% aluminum oxide ($Al_2O_3$) and 3% chromic oxide ($Cr_2O_3$) is ball milled with sufficient water to form a slip. The mixture is then dried, granulated and pressed in suitable dies at pressures of about 10,000 p.s.i. The pressed separators are thus formed into discs and such discs are sintered by heating at 1,800° C. for 2 hours. The resulitng sintered separators are in the form of a substantially single phase solid solution of aluminum oxide and chromic oxide.

Such separators have a thickness of about 0.020 inch. These separators have a transverse strength of 11,000 p.s.i., a porosity of 25% and a conductivity in 30% KOH of 6.1 ohm-cm.

Silver electrode material is prepared using equal parts of silver and silver oxide. These materials are thoroughly mixed and pressed at about 5,000 p.s.i. into the form of discs. The compacted discs are cut to size and spot welded to a fine nickel screen.

The silver electrodes are prepared for use by electrolytic oxidation or charging at room temperature in 30% KOH. After forming, the electrode is removed from the charging stand and assembled in a battery as described below.

Zinc electrodes are prepared by mixing about 97 parts zinc oxide and 3 parts HgO, by weight, in a mixer. After mixing, a weighed amount of this material is placed in an electrode compartment in contact with a fine nickel screen, mixed with a small amount of 30% KOH, and electrolyzed.

The separator and electrodes described above are assembled to form a battery as shown in FIG. 2, employing a plastic case 34 formed of two symmetrical, e.g., Teflon, half portions 36 and 38 which are bolted together as indicated at 40. Compartments 36 and 38 of the case have recesses 42 formed therein which receive the zinc and silver electrodes 44 and 46, respectively, prepared as described above. An aluminum oxide-chromic oxide sintered separator 48 prepared as described above is disposed centrally between the case portions 36 and 38 so that the electrodes 44 and 46 are pressed against opposite surfaces of such separators, with a potassium titanate paper 45 inserted between the zinc electrode 44 and separator 48, and a similar potassium titanate paper 45′ inserted between the silver electrode 46 and separator 48, to aid in supporting such electrodes, according to the invention described in our copending application Serial No. 378,859, filed June 29, 1964. However, it will be understood that if desired, such potassium titanate papers can be omitted. Teflon spacers 50 and 52 are provided about the periphery of separators 48, to form a leak-proof seal. Nickel screens 53 and 55 are in contact with electrodes 44 and 46 adjacent to the bottom of the compartment recesses 42, and silver terminal wires 54 and 56 are connected respectively to the screens 53 and 55, and are brought through the plastic electrode sections at the top of the assembly and connected to terminals 57 and 57′, as shown. Small electrolyte reservoirs 58 and 59 are provided in the upper portion of the respective electrode compartments 36 and 38.

A battery of the type described above and illustrated in FIG. 2 and containing the separator 48 produced according to the invention has operated for at least 158 ½-hour discharge-½-hour charge cycles at 25° C. with good electrical performance, and at a current density during discharge of 10 ma./cm.$^2$ and a voltage discharge plateau of about 1.45 volts.

This example illustrates the high strength characteristics of the separator produced according to the invention, and that such separator when incorporated in a high energy density silver-zinc battery has a chemical composition and a porosity such as to provide a highly efficient battery capable of operating for a large number of discharge-charge cycles and which is resistant to deterioration by KOH electrolyte.

*Example 2*

An aluminum oxide-chromic oxide separator is prepared in the manner described in Example 1 above, except that the initial mixture contains 93% aluminum oxide (alumina) and 7% chromic oxide.

Such separator is incorporated in a silver-zinc battery as described above and illustrated in FIG. 2. This battery operates efficiently for a large number of discharge-charge cycles at 100° C. with good electrical output.

*Example 3*

An aluminum oxide-cobalt oxide solid solution separator is produced by procedure substantially as described in Example 1, except that the starting mixture is in the form of a mixture of 98% aluminum oxide and 2% cobalt oxide by weight, and the mixture sintered at 1,100° C. for 4 hours.

The resulting sintered aluminum oxide-cobalt oxide separator is in the form of a solid solution of these materials, such separators having a high transverse strength of about 10,000 p.s.i., 16.5% porosity and a resistivity in 30% KOH of 8.5 ohm-cm.

Such aluminum oxide-cobalt oxide separator and silver and zinc electrodes prepared as described in Example 1, are assembled to form a battery as described in Example 1 and shown in FIG. 2 of the drawing. The resulting battery operates over at least 143 ½-hour discharge-½-hour charge cycles at 25° C.

*Example 4*

Solid solution separators are formed by mixing, compacting and sintering Compositions C to H at the respective temperatures indicated below and by procedure substantially as described in Example 1. Such compositions contain from 92 to 99.75% aluminum oxide and 0.25 to 8% of the inorganic additive material, e.g., nickel oxide, etc.

| Composition: | Sintering temperature, ° C. |
|---|---|
| C | 1,050 |
| D | 1,000 |
| E | 1,000 |
| F | 1,600 |
| G | 1,550 |
| H | 1,600 |

The resulting aluminum oxide-bearing solid solution separators thus formed from each of the above compositions have a transverse strength of the order of about 10,000 to about 15,000 p.s.i., a porosity of about 15 to about 40%, good conductivity in KOH solution and high resistance to KOH.

Each of such separators is assembled to form a battery as described in Example 1 and shown in FIG. 2 of the drawing. The resulting batteries operate for a large number of ½-hour discharge-½-hour charge cycles at both 25° C. and at 100° C. and at high current density during discharge.

Example 5

A battery substantially similar to that of Example 1 and shown in FIG. 2, and incorporating the aluminum oxide-chromic oxide separator described in Example 1 is assembled, except that the electrodes are silver and cadmium.

Such a battery also has physical properties and electrical characteristics on the order of those for the battery containing the separator of Example 1.

Example 6

A battery substantially similar to that of Example 1 and shown in FIG. 2, is assembled employing the aluminum oxide-chromic oxide separator of Example 1, except that the electrodes are nickel and cadmium.

Such a battery has physical properties and electrical characteristics similar to the battery containing the aluminum oxide-chromic oxide separator of Example 1.

From the foregoing, it is seen that the invention provides strong highly efficient inorganic separators having a chemical composition and structure, which when incorporated in a battery, particularly into a high energy density alkaline battery such as a silver-zinc battery, permit extended operation at ambient temperatures as well as at higher temperatures of operation of the order of 100° C. and above, without deterioration of these separators by alkali electrolyte, and at improved power output.

It will be understood, as indicated by Examples 1, 5 and 6 above, that the inorganic separators of the invention can be employed in combination with any desired high energy density electrode system, including silver-zinc, silver-cadmium, nickel-cadmium, and the like.

During discharge of batteries such as those illustrated in FIGS. 1 and 2, and described in the above examples, as is well known, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of silver-zinc, silver-cadmium, and nickel-cadmium battery systems, are intended to denote either the respective metals themselves or the corresponding oxides thereof.

Further, the separators of the invention can also be employed in other types of batteries such as the lead-acid, fused salt, zinc-air, nickel-zinc and non-aqueous electrolyte type batteries.

While we have described particular embodiments of our invention for purposes of illustration, within the spirit of the invention, it will be understood that the invention is not to be taken as limited except by the scope of the appended claims.

We claim:

1. In a battery containing electrodes and a separator, said separator comprising a sintered porous member consisting essentially of a solid solution of a major proportion of aluminum oxide and a substance selected from the group consisting of the oxides of chromium, cobalt, nickel, magnesium, calcium and iron, said solid solution being substantially free of silicon-bearing material.

2. In a battery as defined in claim 1, employing at least about 75% by weight of said aluminum oxide.

3. In a battery as defined in claim 1, employing in the range from about 90 to about 99.75% of said aluminum oxide and in the range from about 0.25 to about 10% of said substance, by weight.

4. In a battery as defined in claim 1, said substance being employed in the range from about 0.25 to about 8% by weight, the remainder being said aluminum oxide.

5. In a battery as defined in claim 1, employing in the range from 93 to 98% of said aluminum oxide and from 2 to 7% of said substance, by weight.

6. In a battery as defined in claim 4, employing in the range from about 0.25 to about 8% chromic oxide by weight, the remainder being said aluminum oxide.

7. In a battery as defined in claim 4, employing in the range from about 0.25 to about 8% cobalt oxide by weight, the remainder being said aluminum oxide.

8. In a battery as defined in claim 4, employing in the range from about 0.25 to about 8% nickel oxide by weight, the remainder being said aluminum oxide.

9. A battery comprising a pair of electrodes of opposite polarity, and positioned between said electrodes for retaining electrolyte, an separator in the form of a sintered porous membrane consisting essentially of a solid solution of a major proportion of aluminum oxide and a substance selected from the group consisting of the oxides of chromium, cobalt, nickel, magnesium, calcium and iron, said solid solution being substantially free of silicon-bearing material.

10. A battery as defined in claim 9, employing at least about 75% by weight of said aluminum oxide.

11. A battery as defined in claim 9, employing in the range from about 90 to about 99.75% of said aluminum oxide and in the range from about 0.25 to about 10% of said substance, by weight.

12. A battery as defined in claimed 9, said substance being employed in the range from about 0.25 to about 8% by weight, the remainder being said aluminum oxide.

13. A battery as defined in claim 12, employing in the range from about 0.25 to about 8% chromic oxide by weight, the remainder being said aluminum oxide.

14. A battery as defined in claim 12, employing in the range from about 0.25 to about 8% cobalt oxide by weight, the remainder being said aluminum oxide.

15. A battery as defined in claim 12, employing in the range from about 0.25 to about 8% nickel oxide by weight, the remainder being said aluminum oxide.

16. A battery as defined in claim 9, wherein said electrodes are zinc and silver electrodes.

17. A battery as defined in claim 10, wherein said electrodes are zinc and silver electrodes.

18. A battery as defined in claim 11, wherein said electrodes are zinc and silver electrodes.

19. A battery separator in the form of a sintered porous member consisting essentially of a solid solution of from about 90 to about 99.75% of aluminum oxide and from about 0.25 to about 10% of a substance selected from the group consisting of the oxides of chromium, cobalt, nickel, magnesium, calcium and iron, by weight, said solid solution being substantially free of silicon-bearing material.

20. A battery separator as defined in claim 19, employing in the range from 93 to 98% of said aluminum oxide and from 2 to 7% of said substance, by weight.

References Cited

UNITED STATES PATENTS

| | | | |
|---|---|---|---|
| 1,458,377 | 6/1923 | Anderson | 136—146 |
| 2,422,045 | 6/1947 | Ruben | 136—107 |
| 3,244,539 | 4/1966 | Andrew | 106—65 |
| 3,252,810 | 5/1966 | Somers | 106—39 |
| 3,342,616 | 9/1967 | Alper et al. | 106—65 XR |

WINSTON A. DOUGLAS, *Primary Examiner.*

D. L. WALTON, *Assistant Examiner.*

U.S. Cl. X.R.

106—62, 65, 66; 136—146